United States Patent Office 3,098,843
Patented July 23, 1963

3,098,843
NEW CATALYST SYSTEM FOR LINEAR AND CYCLIC POLYMERIZATION OF MONO SUBSTITUTED ACETYLENES
Lionel B. Luttinger, Stamford, Conn., assignor to American Cyanamid Company, New York, N.Y., a corporation of Maine
No Drawing. Original application Oct. 6, 1959, Ser. No. 844,632 Divided and this application May 27, 1960, Ser. No. 32,103
6 Claims. (Cl. 260—91.3)

This invention relates to a new method for polymerizing acetylene and mono-substituted acetylenes with a new catalyst composition comprising a mixture of a transition metal complex represented by the general formula, (I) $[M(R_3Y)_p]_n[X]_m$ wherein $m$ and $n$ are integers of from 1 to 4, inclusive, and when M is osmium, $m$ and $n$ are integers of from 1 to 6, inclusive, $p$ is an integer of from 1 to 6, inclusive, and when M is osmium $p$ is an integer of from 1 to 8, inclusive, M represents a metal selected from the class consisting of nickel, cobalt, palladium, platinum, rhodium, iridium, ruthenium and osmium. R represents at least one member of the class consisting of alkyl, aryl, alkoxy, aryloxy, halogen and cyanoalkyl groups and hydrogen. Y represents an element selected from the class consisting of phosphorous, arsenic, nitrogen, antimony and bismuth, X represents any anion having a valence from 1–4 such as fluoride, chloride, bromide, iodide, phosphate, sulfate, ferrocyanide, etc. and a compound having at least one metal to hydridic hydrogen bond.

In addition to the above definition of R almost any radical is operative such as aldehyde amine and acid radicals. R may also represent three different groups at the same time or two of the same and one different.

The compounds which are used in conjunction with the transition metal complex include all compounds containing a hydridic hydrogen associated with a metal. The term hydridic is used in the customary sense [see J. H. Smalley and S. F. Stafiej, J. Am. Chem. Soc. 81, 582 (1959)], as meaning a hydrogen atom attached to some other atom by a bond (covalent or ionic) which is polarized so that the hydrogen atom is negatively charged (hydridic) as opposed to positively charged (acidic). [See D. T. Hurd, An Introduction to the Chemistry of the Hydrides (John Wiley & Sons, Inc., New York, 1952), pp. 24–26, 56–59.]

Compounds which are within the above definition may preferably be selected from one of the following categories:

(1) Simple known hydrides of groups I to III of the periodic system, such as LiH, $B_2H_6$ etc.

(2) Complex hydrides of group III, such as $NaBH_4$, $LiAlH_4$ etc.

(3) Hydrides from categories (1) and (2) in which one or more, but not all of the hydridic hydrogens have been replaced by other groups; examples of these hydrides are $AlH(CH_3)_2$, $K_2B_2H_4(OH)_2$ etc.

In addition to the above there are certain other less favorable compounds with hydridic hydrogens, such as $SiH_4$. The invention is intended to include these compounds also.

These catalyst systems have been found to be very effective for polymerizing acetylene and mono-substituted acetylenes very simply and conveniently and in substantially high yields. The best choice of solvent depends somewhat on the other components since an interaction is involved. In particular the solvent must be chosen such that some solubility exists in the reaction mass in order to obtain this interaction. The minimum solubility depends on the particular combination of components since one assists the other, but it is of the order of magnitude of 0.001%. There is no maximum value. These catalyst systems are found to operate efficiently in polar solvents such as $H_2O$ and alcohols and in semi-polar solvents such as dibetamethoxy ethyl ether (diglyme) and acetonitrile.

It is rather surprising and unexpected that the mixture of the above transition metal complexes and metal hydrides should polymerize acetylenes so effectively since neither of the catalysts' components can be used by itself to perform the polymerization. Reppe has found that a limited number of transition metal complexes can be used to trimerize a few acetylenes to form aromatic products. (See Reppe and Schweckendick, Annalen, 560, 104 (1958).) However, there is no teaching that linear polymers can be obtained nor any suggestion that the combination of these metal hydrides and transition metal complexes can operate as an entirely new catalyst system to polymerize acetylenes. The use of metal hydrides alone or in conjunction with another compound or complex for polymerizing acetylenes is totally absent from the prior art.

Previously these mono-substituted acetylenes had been polymerized with nickel-carbonyl-phosphine catalysts such as those set forth in copending application, Serial No. 774,150, filed November 17, 1958, now Patent No. 3,032,-573, to produce new linear polymers which are disclosed and claimed in copending applications, Serial No. 774,-152, filed November 17, 1958, now Patent No. 2,961,-330, and Serial No. 803,375, filed April 1, 1959, now Patent No. 3,066,119. The present invention, however, is a decided improvement over the use of these nickel-carbonyl-phosphine catalysts since a large variety of solvents may be used and air and elevated pressures are also not detrimental.

Briefly the present invention comprises merely forming a mixture of the transition metal complex with the metal hydride in an extensive range of proportions which may be from about 1:50 to 50:1, and which may be even greater depending on the acetylene polymerized and the conditions of the reaction. In some instances a minuscle amount of one of the components with a large amount of the other may be operative with highly reactive acetylene and at elevated temperatures.

Where the acetylene to be polymerized is in the gaseous state such as acetylene itself, monomethyl acetylene and monoethyl acetylene the reaction takes place by bubbling the reactant through the catalyst system. The range of solvents which may be used for the liquid acetylenes is equally as broad for the gaseous acetylenes. The need for stirring is obviated in this procedure by agitation incurred from the bubbling acetylene.

The hydrides of the group III elements such as sodium borohydride, lithium aluminum hydride and diborane have been found to be more effective than the simple hydrides of other metals. When used with the transition metal complexes acetylene and the monosubstituted acetylenes can be polymerized at room temperature and with higher yields than when the other hydrides are used. The borohydrides in particular are advantageously employed since they are operative in a large variety of solvents and are easily obtained commercially.

Many of the metal hydrides are obtained commercially or are easily prepared. For example the alkali and alkaline earth metals react with hydrogen in an atmosphere of that gas. Reference is made to Gaylord, "Reduction With Complex Metal Hydrides," Interscience Publishers, New York, 1956.

The alkali-metal borohydrides, especially $LiBH_4$, $KBH_4$ and $NaBH_4$, are well-known compounds. They may be obtained commercially or prepared according to the equation, $$4MH + BF_3Et_2O \rightarrow MBH_4 + 3MF + Et_2O$$

or by the method disclosed in U.S. Patent No. 2,880,058 to Bronaugh according to the equation, $$(CH_3)_3N:BCl_3 + 4MH \rightarrow (CH_3)_3N + MBH_5 + 3NaCl$$

The alkali metal aluminum hydrides and borohydrides are well known and are easily obtained commercially.

The transition metal complexes as represented by Formula I are complexes of a salt of the metals of group VIII of the periodic chart and a ligand composed of an element from group V of the periodic chart substituted with an organic or inorganic residue. They are easily prepared by mixing the particular metal salt with the particular ligand in a polar solvent such as a ketone, alcohol and like substances, the mixture is then allowed to stand whereupon the crystalline complex is formed after from a few hours to a day or two. The physical appearance of these complexes differ widely. They may be white or range in color from blue to yellow and red and be of many varied crystalline forms.

Applicant has found that the anion represented by X in the transition metal complex of Formula I is not critical and may vary considerably. The only property it must have is that it be able to take part in the formation of a complex with the particular metal and ligand with which it is to be used. These include all anions having valences from 1–4 and 1–6 if osmium is employed. There is no apparent need to have the anion strongly ionized since rather weak anions such as acetate and nitrile radicals are operative. The valence is not critical since both monovalent radicals such as chloride and quadrivalent radicals such as ferrocyanide are operative.

The following examples are presented by way of illustrating the preparation of the transition metal complexes.

PREPARATION OF CATALYTICALLY ACTIVE COMPLEXES

Example 1

$[P(CH_2CH_2CN)_3]_2NiBr_2$ 3.3 g. triscyanoethyl phosphine is dissolved in 50 cc. acetone. 2.2 g. of anhydrous $NiBr_2$ is added. The green crystals of $[P(CH_2CH_2CN)_3]_2NiBr_2$ are filtered and dried.

Example 2

$[P(CH_2CH_2CN)_3]_2NiCl_2$ 13.2 g. triscyanoethyl phosphine is dissolved in 50 cc. acetone. 5.2 g. anhydrous $NiCl_2$ is added. The blue crystals of $[P(CH_2CH_2CN)_3]_2NiCl_2$ are filtered off, as in the case of the bromide, described above.

Example 3

$(\phi_3P)_2NiCl_2$

The procedure of Venanzi [J.C.S. 719 (1958)], is followed, with minor changes. 6.5 g. anhydrous $NiCl_2$ is dissolved in 10 cc. $H_2O$. 250 cc. of glacial acetic acid is added. 26.25 g. triphenyl phosphine suspended in 125 cc. glacial acetic acid is added to the solution of the nickel salt. After standing overnight, the mixture deposits green-black crystals of $(\phi_3P)_2NiCl_2$. These are filtered off, washed with glacial acetic acid, and dried.

Example 4

$[(nC_4H_9)_3P]_2NiCl_2$

Under a nitrogen blanket, 12 g. anhydrous $NiCl_2$ is dissolved in 150 cc. of ice cold ethanol. 40 cc. of $(nC_4H_9)_3P$ is added. Brilliant red crystals of $[(nC_4H_9)_3P]_2NiCl_2$ are formed. These are filtered, washed and dried.

Example 5

$[(nC_4H_9)_3P]_2PdCl_2$

Under a nitrogen blanket 1.78 g. of $PdCl_2$ is suspended in 50 cc. of air free $H_2O$. 8.5 cc. of $(nC_4H_9)_3P$ are added and the resulting emulsion is stirred overnight and then stored for a week in a refrigerator. Fine yellow crystals of $[(nC_4H_9)_3P]_2PdCl_2$ are formed. These are recrystallized from ethanol and dried.

Representative of the type of acetylenes which may be polymerized are acetylene and mono-substituted acetylenes represented by the general formula, $$RC \equiv CH$$

where R represents a member of the class consisting of alkyl, aryl, aralkyl, alkaryl, hydroxyalkyl, hydroxyaryl, haloalkyl, haloaryl, aminoalkyl, cyanoalkyl, alkoxy, aryloxy, vinyl, allyl, alkanoylcarboxy and alkanoyloxy radicals, also acetylenic, radicals and substituted aryl, naphthyl, etc.

There is no criticality in the value of R; it includes all substituted alkyl and aryl groups which contain almost any number of substituents in any position with different substituents on the same ring or chain. There may be nitro, halo, amino, vinyl and sulfonic groups on the same ring at the same time.

Illustrative examples of radicals represented by R in the above formulas are methyl through octadecyl or higher; cyclopropyl through cycloheptyl, phenyl, naphthyl, tolyl, benzyl, N,N-diethyl aminomethyl through N,N-diethyl aminodecyl or higher, ethoxy through octadecyloxy or higher and polyethoxy through polyoctadecyloxy groups where the multiple alkyl groups may be of different lengths and cyanoethyl through cyanodecyl or higher.

The following examples show the use of the catalyst systems of the present invention for the preparation of different acetylenes. These examples are intended to aid in a better understanding of the invention and are not meant as limitations as to scope. Unless otherwise defined all amounts are given by weight.

Example 6

Acetylene is continuously bubbled into 70 cc. of ethanol. 2.4 g. $NaBH_4$ is added. After mixing, 0.7 g.

$[P(CH_2CH_2CN)_3]_2NiCl_2$ is added. After 4 hours, the reaction is stopped. A solid, almost black material, about 1 g. in quantity, is obtained as well as a yellow solution. The solid is extracted with benzene, petroleum ether, acetone, and water, and finally dried.

I.R. showed strong band at 1015 cm.$^{-1}$.

Example 7

*Polymerization of heptyne-1.*—16 cc. of heptyne-1 in 70 cc. of $CH_3CN$ were stirred, and 1.2 g. of $NaBH_4$ were added. A few minutes later, 0.50 g. of $[P(CH_2CH_2CN)_3]_2NiBr_2$ was added. The flask was stirred for about 5 hours, without heating. The contents were then partitioned between water and organic solvents. The oil layer was solvent stripped. Finally, 7 cc. of a tan oil remained. Vapour phase chromatography showed that this was largely linear dimer and trimer of heptyne-1 (by comparison with authentic samples). This was also corroborated by infrared spectroscopy (bands at 975, 895, 957 cm.$^{-1}$); mass spectroscopy showed that 35% of the material was dimer, 51% trimer, with the balance being almost exclusively monomer.

Further experiments which are conducted in a manner similar to the above example are set forth in the following table.

FURTHER POLYMERIZATIONS OF ACETYLENES

| Ex. No. | Acetylene | Acetylene concentration, parts | Concentration of compound containing hydridic hydrogen in parts | Transition metal complex | Transition metal complex concentration in parts | Solvent | Temp., °C. and time | Product |
|---|---|---|---|---|---|---|---|---|
| 8 | Heptyne-1 | 12 | NaBH$_4$, 0.56 | NiCl$_2$[P(C$_4$H$_9$)$_3$]$_2$ | 0.50 | 55.0 EtOH | 25/20 min | Linear polymer. |
| 9 | ----do---- | 12 | NaBH$_4$, 0.80 | NiCl$_2$[P(C$_2$H$_4$CN)$_3$]$_2$ | 0.50 | 55.0 EtOH | 25/2 hrs | Do. |
| 10 | ----do---- | 12 | NaBH$_4$, 0.80 | NiCl$_2$CH$_2$-P(C$_2$H$_4$CN)$_2$<br>CH$_2$-P(C$_2$H$_4$CN)$_2$ | 0.50 | 55.0 EtOH | 25/5 hrs | Do. |
| 11 | ----do---- | 12 | NaBH$_4$, 0.80 | Ni(CNS)$_2$($\phi_3$P)$_2$ | 0.50 | 55.0 EtOH | 25/5 hrs | Do. |
| 12 | Heptyne-1 and pentyne. | 6<br>6 | NaBH$_4$, 0.80 | NiCl$_2$[P(C$_2$H$_4$CN)$_3$]$_2$ | 0.50 | 55.0 EtOH | 25/3 hrs | Do. |
| 13 | Propargyl chloride. | 17 | NaBH$_4$, 0.50 | NiCl$_2$[P(C$_2$H$_4$CN)$_3$]$_2$ | 0.15 | 55.0 EtOH | 25/5 hrs | Do. |
| 14 | Propargyl alc. | 15 | KBH$_4$, 0.20 | NiCl$_2$[P(C$_2$H$_4$CN)$_3$]$_2$ | 0.10 | 55.0 H$_2$O | 25/10 min | Linear and aromatic polymer. |
| 15 | ----do---- | 8 | KBH$_4$, 0.09 | NiCl$_2$[(PC$_2$H$_4$CN)$_3$]$_2$ | 0.03 | 55.0 H$_2$O | 25/1 hr | Do. |
| 16 | Heptyne-1 | 7 | SiH$_4$, 0.50 | Pd(NO$_3$)$_2$[(C$_4$H$_9$)$_3$P]$_2$ | 0.50 | 30.0 diglyme | 125/2 hrs | Linear polymer. |
| 17 | Ethyl propiolate. | 3 | NaBH$_4$, 0.10 | NiCl$_2$[P(C$_2$H$_4$CN)$_3$]$_2$ | 0.05 | 24.0 EtOH | 25/2 hrs | Polymer. |
| 18 | 1,7-octadiyne | 15 | NaBH$_4$, 0.80 | NiCl$_2$[P(C$_2$H$_4$CN)$_3$]$_2$ | 0.50 | 55.0 EtOH | 25/1 hr | Linear polymer. |
| 19 | Heptyne-1 | 12 | NaBH$_4$, 0.40 | NiCl$_2$[P(C$_2$H$_4$CN)$_3$]$_2$ | 0.40 | 55.0 CH$_3$CN | 25/20 min | Do. |
| 20 | ----do---- | 12 | NaBH$_4$, 0.80 | NiBr$_2$[P(C$_2$H$_4$CN)$_3$]$_2$ | 0.50 | 55.0 EtOH | 25/1 hr | Do. |
| 21 | 3-diethylamine propyne-1. | 15 | NaBH$_4$, 0.80 | NiCl$_2$[P(C$_2$H$_4$CN)$_3$]$_2$ | 0.50 | 55.0 EtOH | 25/2 hrs | Polymer. |
| 22 | Heptyne-1 | 12 | NaBH$_4$, 0.80 | NiCl$_2$[P(C$_2$H$_4$CN)$_3$]$_2$ | 0.50 | 55.0 EtOH | 80/30 min | Linear polymer. |
| 23 | ----do---- | 12 | NaBH$_4$, 0.45 | NiCl$_2$[P(C$_2$H$_4$CN)$_3$]$_2$ | 0.05 | 55.0 EtOH | 80/30 min | Do. |
| 24 | ----do---- | 12 | NaBH$_4$, 0.02 | NiCl$_2$[P(C$_2$H$_4$CN)$_3$]$_2$ | 0.25 | 55.0 EtOH | 25/2 hrs | Do. |
| 25 | Acetylene | | NaBH$_4$, 2.4 | NiCl$_2$[P(C$_2$H$_4$CN)$_3$]$_2$ | 0.70 | 55.0 CH$_3$CN | 25/4 hrs | Do. |
| 26 | ----do---- | | KBH$_4$, 2.4 | NiCl$_2$[P(C$_2$H$_4$CN)$_3$]$_2$ | 0.70 | 55.0 H$_2$O | 25/4 hrs | Do. |
| 27 | Heptyne-1 | 5.90 | NaBH$_4$, 1.10 | NiCl$_2$[(C$_4$H$_9$)$_3$P]$_2$ | 0.25 | 23.0 CH$_3$CN | 25/1½ hrs | Do. |
| 28 | ----do---- | 11.80 | NaBH$_4$, 2.20 | NiCl$_2$[(C$_4$H$_9$)$_3$P]$_2$ | 0.49 | 55.0 CH$_3$CN | 25/2½ hrs | Do. |
| 29 | ----do---- | 11.80 | NaBH$_4$, 1.20 | NiBr$_2$[(C$_2$H$_4$CN)$_3$P]$_2$ | 0.50 | 55.0 CH$_3$CN | 25/6 hrs | Do. |
| 30 | ----do---- | 11.80 | NaBH$_4$, 1.50 | NiCl$_2$$\phi_3$P]$_2$ | 0.50 | 55.0 CH$_3$CN | 25/6½ hrs | Do. |
| 31 | ----do---- | 11.80 | NaBH$_4$, 1.10 | NiBr$_2$[(C$_2$H$_4$CN)$_3$P]$_2$ | 0.50 | 55.0 CH$_3$CN | 25/6 hrs | Do. |
| 32 | Phenylacetylene | 15.80 | NaBH$_4$, 1.10 | NiCl$_2$[(C$_4$H$_9$)$_3$P]$_2$ | 0.50 | 55.0 CH$_3$CN | 25/4½ hrs | Linear and aromatic polymer. |
| 33 | ----do---- | 14.90 | NaBH$_4$, 0.25 | NiCl$_2$[(C$_4$H$_9$)$_3$P]$_2$ | 0.10 | 55.0 CH$_3$CN | 25/4¼ hrs | Do. |
| 34 | ----do---- | 14.90 | NaBH$_4$, 0.10 | NiCl$_2$[(C$_4$H$_9$)$_3$P]$_2$ | 0.01 | 55.0 CH$_3$CN | 25/5¼ hrs | Do. |
| 35 | 1,6-heptadiyne | 13.00 | NaBH$_4$, 0.52 | NiCl$_2$[(C$_4$H$_9$)$_3$P]$_2$ | 0.50 | 55.0 CH$_3$CN | 25/4 hrs | Linear polymer. |
| 36 | Heptyne-1 | 13.30 | NaBH$_4$, 2.00 | NiCl$_2$[(C$_4$H$_9$)$_3$P]$_2$ | 0.50 | 55.0 EtOH | 25/5 hrs | Do. |
| 37 | ----do---- | 12.60 | NaBH$_4$, 1.00 | NiCl$_2$[(C$_4$H$_9$)$_3$P]$_2$ | 0.58 | 55.0 EtOH | 25/80/43 min | Do. |
| 38 | Acetylene | (¹) | NaBH$_4$, 2.40 | NiCl$_2$[(C$_2$H$_4$CN)$_3$P]$_2$ | 0.70 | 56.0 EtOH | 25/4¼ hrs | Do. |
| 39 | ----do---- | (¹) | NaBH$_4$, 2.00 | NiCl$_2$[(C$_4$H$_9$)$_3$P]$_2$ | 1.00 | 94.0 EtOH | 25/5½ hrs | Do. |
| 40 | Heptyne-1 | 12.60 | NaBH$_4$, 2.60 | NiCl$_2$[(C$_4$H$_9$)$_3$P]$_2$ | 0.50 | 94.0 EtOH | 25/3 hrs | Do. |
| 41 | ----do---- | 11.80 | KBH$_4$, 3.50 | NiCl$_2$[(C$_4$H$_9$)$_3$P]$_2$ | 0.40 | 55.0 EtOH | 25/5½ hrs | Do. |
| 42 | Propargylchloride. | 15.50 | KBH$_4$, 0.90 | NiCl$_2$[(C$_4$H$_9$)$_3$P]$_2$ | 0.50 | 39.0 H$_2$O | 25/10 min | Polymer. |
| 43 | Acetylene | (¹) | KBH$_4$, 1.25 | NiCl$_2$[(C$_2$H$_4$CN)$_3$P]$_2$ | 0.95 | 94.0 H$_2$O | 25/6 hrs | Linear polymer. |
| 44 | Heptyne-1 | 8.10 | LiAlH$_4$, 1.25 | NiBr$_2$[(C$_2$H$_4$CN)$_3$P]$_2$ | 0.50 | 43.0 diglyme | 25/4 hrs | Do. |
| 45 | ----do---- | 12 | NaBH$_4$, 1 | [P(CH$_2$CH$_2$CN)$_3$]$_2$NiSO$_4$ | 0.5 | 55.0 ethanol | 25/3 hrs | Do. |
| 46 | ----do---- | 12 | NaBH$_4$, 1 | [P(CH$_2$CH$_2$CN)$_3$]$_2$Ni$_3$(PO$_4$)$_2$ | 1.0 | ----do---- | 25/3 hrs | Do. |
| 47 | ----do---- | 12 | NaBH$_4$, 1 | [P(CH$_2$CH$_2$CN)$_3$]$_2$Ni$_2$Fe(CN)$_6$ | 1.0 | ----do---- | 25/3 hrs | Do. |
| 48 | ----do---- | 12 | NaBH$_4$, 1 | [As(C$_2$H$_5$)$_3$]$_2$NiCl$_2$ | 0.5 | ----do---- | 25/3 hrs | Do. |
| 49 | ----do---- | 12 | NaBH$_4$, 1 | [As(C$_2$H$_5$)$_3$]$_2$Co(NO$_3$)$_2$ | 0.5 | ----do---- | 25/3 hrs | Do. |
| 50 | ----do---- | 12 | NaBH$_4$, 1 | [As(C$_2$H$_5$)$_3$]$_2$PdSO$_4$ | 1.0 | ----do---- | 25/3 hrs | Do. |
| 51 | ----do---- | 12 | NaBH$_4$, 1 | [Sb(C$_2$H$_5$)$_3$]$_2$Co$_3$(PO$_4$)$_2$ | 1.0 | ----do---- | 25/3 hrs | Do. |
| 52 | ----do---- | 12 | NaBH$_4$, 1 | [N(C$_4$H$_9$)$_3$]$_2$NiCl$_2$ | 0.5 | ----do---- | 25/3 hrs | Do. |
| 53 | ----do---- | 12 | NaBH$_4$, 1 | [PH(C$_4$H$_9$)$_2$]$_2$NiCl$_2$ | 0.5 | ----do---- | 25/3 hrs | Do. |
| 54 | ----do---- | 12 | NaBH$_4$, 1 | [PH$_2$(C$_4$H$_9$)]$_2$Ni(NO$_3$)$_2$ | 0.5 | ----do---- | 25/3 hrs | Do. |
| 55 | ----do---- | 12 | NaBH$_4$, 1 | (NH$_3$)$_2$CoCl$_2$ | 0.5 | ----do---- | 25/3 hrs | Do. |
| 56 | ----do---- | 12 | NaBH$_4$, 1 | [P(C$_4$H$_9$)$_3$]$_3$RhCl$_3$ | 1.0 | ----do---- | 25/3 hrs | Do. |
| 57 | ----do---- | 12 | NaBH$_4$, 1 | [As(C$_2$H$_5$)$_3$]Rh(PO$_4$) | 1.0 | ----do---- | 25/3 hrs | Do. |
| 58 | ----do---- | 12 | NaBH$_4$, 1 | [P(C$_2$H$_5$)$_3$]$_3$RuCl$_3$ | 1.0 | ----do---- | 25/3 hrs | Do. |
| 59 | ----do---- | 12 | NaBH$_4$, 1 | [As(C$_2$H$_5$)$_3$]$_2$PdSO | 1.0 | ----do---- | 25/3 hrs | Do. |
| 60 | ----do---- | 12 | NaBH$_4$, 1 | [AsH(C$_2$H$_5$)$_2$SbH$_2$(C$_2$H$_5$)]PdBr$_2$ | 1.0 | ----do---- | 25/3 hrs | Do. |
| 61 | ----do---- | 12 | NaBH$_4$, 1 | [As(C$_2$H$_5$)$_3$P(C$_2$H$_5$)$_3$]OsCl$_4$ | 1.0 | ----do---- | 25/3 hrs | Do. |
| 62 | ----do---- | 12 | NaBH$_4$, 1 | [(C$_4$H$_9$)$_3$N]$_3$IrCl$_3$ | 1.0 | ----do---- | 25/3 hrs | Do. |
| 63 | ----do---- | 12 | NaBH$_4$, 1 | [P(C$_2$H$_5$)$_2$]$_3$Ir(PO$_4$) | 1.0 | ----do---- | 25/3 hrs | Do. |
| 64 | ----do---- | 12 | NaBH$_4$, 1 | [P(C$_2$H$_5$)$_3$]$_2$PtCl$_2$ | 1.0 | ----do---- | 25/3 hrs | Do. |
| 65 | ----do---- | 12 | NaBH$_4$, 1 | P$\phi_3$]$_2$PtBr$_2$ | 1.0 | ----do---- | 25/3 hrs | Do. |
| 66 | ----do---- | 12 | NaBH$_4$, 1 | As$\phi_3$]$_2$Pt(SO$_4$)$_2$ | 1.0 | ----do---- | 25/3 hrs | Do. |
| 67 | ----do---- | 12 | LiBH$_4$, 1 | [(C$_4$H$_9$)$_3$P]$_2$Ni(NO$_3$)$_2$ | 0.5 | ----do---- | 25/3 hrs | Do. |
| 68 | ----do---- | 12 | Ca(BH$_4$)$_2$, 1 | P(C$_4$H$_9$)$_3$]$_2$Co(CNS)$_2$ | 0.5 | ----do---- | 25/3 hrs | Do. |
| 69 | ----do---- | 12 | Al(BH$_4$)$_3$, 1 | P(C$_4$H$_9$)$_3$]$_2$CoBr$_2$ | 0.5 | ----do---- | 25/3 hrs | Do. |
| 70 | ----do---- | 12 | NaBH$_3$C$_2$H$_5$, 1 | P(C$_4$H$_9$)$_3$]NiCl$_2$ | 0.5 | ----do---- | 25/3 hrs | Do. |
| 71 | ----do---- | 15 | LiH, 1 | [(C$_4$H$_9$)$_3$P]$_2$NiCl$_2$ | 0.5 | 80.0 diglyme | 149-159/2 hrs | Do. |
| 72 | ----do---- | 20 | B$_2$H$_6$, 0.5 | [(C$_4$H$_9$)$_3$P]N$_2$NiCl$_2$ | 0.5 | 50.0 g. CH$_3$CN r.t. plus 20.0 g. tetrahydrofuran. | 25/2 hrs | Do. |
| 73 | ----do---- | 20 | CaH$_2$, 1 | [(C$_4$H$_9$)$_3$P]$_2$NiCl$_2$ | 0.50 | Diglyme | 170-200/2 hrs | Do. |
| 74 | ----do---- | 12 | NaBH(C$_2$H$_5$)$_3$, 0.5 | [(C$_2$H$_4$CN)$_3$P]$_2$CoCl$_2$ | 0.50 | 75 benzene | 25/4 hrs | Do. |
| 75 | Propyne | (¹) | NaBH$_4$, 2.0 | [(C$_4$H$_9$)$_3$P]$_2$NiCl$_2$ | 1.0 | 100 EtOH | 21/18 hrs | Polymer. |
| 76 | Propyne and acetylene. | (¹) | NaBH$_4$, 2.0 | [(C$_4$H$_9$)$_3$P]$_2$NiCl$_2$ | 1.0 | 100 EtOH | 24/17 hrs | Copolymer. |
| 77 | Heptyne-1 | 12 | NaBH$_4$, 1.0 | [(C$_4$H$_9$)$_3$P]$_2$NiCl$_2$ | 1.0 | 70 benzene | 25/4 hrs | Linear polymer. |
| 78 | Pentyne-1 | 12 | B$_2$H$_6$, 0.5 | [(C$_4$H$_9$)$_3$P]$_2$PdCl$_2$ | 0.5 | 80 tetrahydrofuran. | 25/4 hrs | Do. |

¹ Saturated solvent.

As stated in copending application Serial No. 774,152, the polymers prepared by the present invention may be used as drying oils and additives to drying oils for varnishes, enamels, and paints. Their very nature suggests them to be useful as ultraviolet light absorbers, antiozonants, intermediates for making polyalcohol, polymethoxides, methoxy resins, etc. Moreover, merely by total hydrogenation they become saturated aliphatic or alicyclic compounds or by partial hydrogenation one can obtain products that contain both saturated and unsaturated bonds between adjacent carbon atoms and which have intermediate properties. The invention is further applicable to all copolymers formed from unconjugated diacetylenes and mono-substituted acetylenes and different monomers of the same class or type of acetylene.

Many acetylenes such as phenylacetylene and the unconjugated diacetylenes give both linear and some aromatic products. The amounts of each differ with reactants.

The structures of the polymers herein disclosed have been determined by infrared and ultraviolet spectrophotometry, by mass spectrography, vapor phase chromatography and in some cases by elemental analysis. The presence of linear polymers of mono-substituted acetylenes is demonstrated, e.g. for the simple alkyl acetylenes by infrared bands at 2200–2250, 1625–1650, 970–980, and 890–900 cm.$^{-1}$ and by ultraviolet absorption in the 250–300 m region. The 1,2,4-trisubstituted aromatic groups which are found in the products as well as certain other types of aromatic groupings are distinguished by infrared absorption in the 1600–1625, 1500–1525, 860–880, and 800–820 cm.$^{-1}$ regions and ultraviolet absorption between 270 and 280 m with a=10–15. The relative amounts of linear polymers or mono-substituted acetylenes, and aromatic polymers such as trisubstituted benzenes could be estimated by comparison of the intensities of the 970–980 cm.$^{-1}$ and 800–820 cm.$^{-1}$ infrared bands of the polymer or copolymer. The molecular weights of these polymers range from below 1000 to at least 100,000.

In the case of acetylene itself, the reaction product consists in general of two materials, (a) a yellow oil having the ultraviolet spectrum of systems of several conjugated double bonds (polyenes, where the number of double bonds per molecule may range from 3 to about 12), and (b) a black, polymeric material, insoluble in all solvents, often having a characteristic I.R. maximum at about 1010 cm.$^{-1}$ and possessing some degree of crystallinity as shown by X-ray diffraction analysis. This information shows the latter material to be a linear high polymer of acetylene.

The structures of the lower homopolymers and copolymers have been determined primarily by comparing their mass spectra with their infrared and ultraviolet spectra as well as by vapor phase chromatography. All of these products had parent peaks in their mass spectrum which corresponded to their molecular weight. For example, the mass spectrum of the low polymer product from the copolymerization of pentyne-1 with heptyne-1 contained parent peaks for mass numbers 260, 288, 328, 356 which corresponded to two heptynes plus one pentyne, three heptynes, two pentynes plus two heptynes, and three heptynes plus one pentyne, respectively. The relative amounts of these various products could also be determined by the relative peak heights.

The catalyst system described hereinbefore and claimed in the appended claims is useful not only in the polymerization of acetylene and of various substituted acetylenes, alone or admixed with each other or with other copolymerizable materials, but is also useful in the homopolymerization or copolymerization of other unsaturated compounds, more particularly olefinic compounds, alone or admixed with each other or with other copolymerizable materials, under conditions substantially the same as those used in polymerization of various acetylenes. For example, we found that butadiene was polymerized to liquid and solid products using sodium borohydride (3 parts) and bis-(triscyanoethyl phosphine) nickel dichloride (3 parts) and 100 parts ethanol at 100° C. The reaction was carried out in an autoclave. Also we found that ethylene was polymerized to liquid and solid products at room temperature (20°–30° C.) using sodium borohydride (4 parts) and bis(triscyanoethyl phosphine) nickel dichloride (1 part) and 100 parts of ethanol. Still further, we found that acrylonitrile was polymerized to a solid product at 80° C. using sodium borohydride (4 parts) and bis(triscyanoethyl phosphine) nickel dichloride (1 part) and acetonitrile (70 parts).

This application is a divisional application of Serial No. 844,632 filed on October 6, 1959.

I claim:
1. A method of polymerizing a polymerizable compound having the general formula:

$$RC \equiv CH$$

wherein R represents a member of the class consisting of hydrogen, alkyl, aryl, aralkyl, alkaryl, hydroxy substituted alkyl, halo substituted alkyl, hydroxy substituted aryl, amino substituted alkyl, alkoxy, vinyl, allyl, alkanoylcarboxy and alkanolyoxy by the reaction of said compound in the presence of a catalyst composition comprising a mixture of (1) a transition metal complex represented by the general formula:

$$X_n[M(R'_3Y)_p]_m$$

wherein X is an anion selected from the group consisting of Cl, Br, CNS, NO$_3$, SO$_4$, PO$_4$, and CN; M is a metal selected from the group consisting of nickel, cobalt, palladium, platinum, rhodium, iridium, ruthenium and osmium; R' represents at least one member selected from the group consisting of hydrogen, alkyl, aryl, alkaryl, aralkyl and cyanoalkyl; Y is an element selected from the group consisting of phosphorous, arsenic, nitrogen, antimony and bismuth wherein m and n are integers from 1 to 4, inclusive, and p is an integer from 1 to 6, inclusive, when M is any of the metals set forth in the above definition for M except osmium; and m and n are integers from 1 to 6, inclusive, and p is an integer from 1 to 8, inclusive, when M is osmium; and (2) a metal hydride having at least one metal to hydridic hydrogen bond wherein said hydric hydrogen atom is attached to some other atom by a bond which is polarized so that the hydrogen atom is negatively charged.

2. A method such as set forth in claim 1 wherein the compound to be polymerized is acetylene.

3. A method such as set forth in claim 1 wherein the compound to be polymerized is propargyl alcohol.

4. A method such as set forth in claim 1 wherein the compound to be polymerized is heptyne-1.

5. A method such as set forth in claim 1 wherein the compound to be polymerized is propyne.

6. A method such as set forth in claim 1 wherein the compound to be polymerized is phenyl acetylene.

References Cited in the file of this patent

UNITED STATES PATENTS

| | | |
|---|---|---|
| 2,738,364 | Reppe | Mar. 13, 1956 |
| 2,845,451 | Lautenschlager et al. | July 29, 1958 |
| 2,892,826 | Peters et al. | June 30, 1959 |
| 2,918,459 | Nowlin et al. | Dec. 22, 1959 |
| 2,959,576 | Payne | Nov. 8, 1960 |
| 2,961,330 | Meriwether | Nov. 22, 1960 |

UNITED STATES PATENT OFFICE

CERTIFICATE OF CORRECTION

Patent No. 3,098,843            July 23, 1963

Lionel B. Luttinger

It is hereby certified that error appears in the above numbered patent requiring correction and that the said Letters Patent should read as corrected below.

Column 2, line 15, for "(1958)" read -- (1948) --; columns 5 and 6, under the heading "Transition metal complex", Ex. No. 59, for "$[As(C_2H_5)_3]_2PdSO$" read -- $[As(C_2H_5)_3]_2PdSO_4$ --.

Signed and sealed this 11th day of February 1964.

(SEAL)
Attest:

ERNEST W. SWIDER
Attesting Officer

EDWIN L. REYNOLDS

Acting Commissioner of Patents